June 28, 1938. L. EMANUELI 2,122,281
HIGH TENSION ELECTRICAL APPARATUS
Filed Dec. 26, 1935
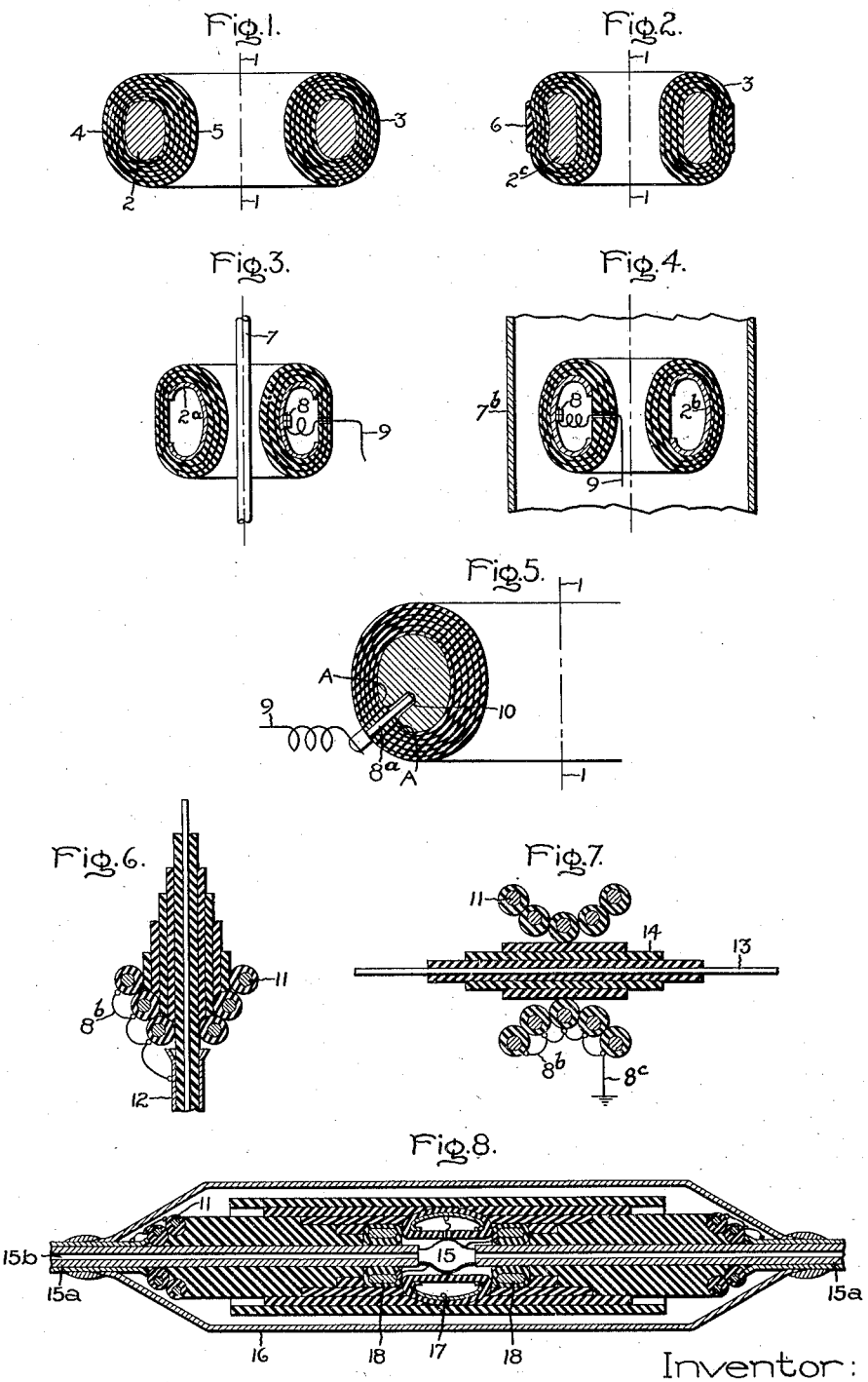
Inventor:
Luigi Emanueli,
by Harry E. Dunham
His Attorney.

Patented June 28, 1938

2,122,281

UNITED STATES PATENT OFFICE 2,122,281

HIGH TENSION ELECTRICAL APPARATUS

Luigi Emanueli, Milan, Italy, assignor to Società Italiana Pirelli, a corporation of Italy Application December 26, 1935, Serial No. 56,282
In Italy January 30, 1935

3 Claims. (Cl. 173—268)

The present invention refers to high tension electrical apparatus and particularly to terminals of electric cables, to bushings and to joints of electric cables. It refers in general to all kinds of apparatus in which there is a symmetrical distribution of the electric field around an axis and high gradients of potential near the electrodes.

The present invention has for its object the provision of an improved form of electrode having an insulating covering of high dielectric strength for controlling the distribution of the electric field in high tension electrical apparatus.

The attached drawing serves to illustrate the invention, wherein Figs. 1, 2, 3 and 4 represent various constructive forms of the insulated electrodes which embody the present invention; Fig. 5 shows a particular constructive form of the electrical connection of the electrode, and Figs. 6, 7 and 8 show schematically electrical apparatus in which electrodes according to the present invention are used.

The type of electrode involving the subject matter of the present invention always has the toroidal form, that is, the form of a ring. Fig. 1 shows it in axial section in its most simple form, where $1-1$ indicates the symmetry axis of the electric field, 2 the electrode made of conductive material, either solid, as drawn, or hollow, or even filled with another material. It has a covering 3 of insulating material in the form of a tape wound thereon with tight and overlapping spirals which follow the outline of the meridian section of the ring, said tape being threaded through the central opening in the ring and over the outer surface thereof to form layers. The cross-section of the electrode can, according to the particular case, be either round, elliptic, oval or of any other form, or even with rectilinear or concave portions. In all cases, the surfaces are well rounded.

The insulation can be of various kinds, for example, of textile materials, in particular silk. The most suitable material seems to be paper, in the form of tape, preferably impregnated with insulating fluid before or after its application on the ring.

Owing to the different lengths of the parallel circles on the ring at the various distances from the axis $1-1$, the insulation thickness will be greater at the inner zone 5 nearer the axis and less at the outer zone 4.

In order to obtain a very compact winding without wrinkles in the paper, it is, of course, necessary that the width of the tape be proportionate both to the minimum radius of the ring and to the maximum radius of its meridian section. In some cases, to obtain a greater tension of the spirals or turns of paper tape, the electrode $2^c$ is formed with the external part of its surface slightly concave as shown in Fig. 2; in such a case, when the tape has been wound, a band 6 of insulating material is applied very tightly on the winding along the parallel circles of the ring, on the concave part of the surface, so that the covering comes at each point in contact with the electrode. If this is done carefully, the winding when finished is always as compact as if it had been made on a cylindrical electrode.

In the case of Fig. 3, electric tension is applied between the toroidal electrode $2^a$ and an internal coaxial electrode or conductor 7. In this case, the effective insulation is that on the internal portion of the surface of the ring. In the case of Fig. 4 instead, where the electric tension is applied between the toroidal electrode $2^b$ and an external coaxial electrode $1^b$, the effective insulation is that on the outside part of the ring. In other cases, where the electric stress has the same direction as the axis, the effective parts are one or both of the end zones of the electrode which are perpendicular to the axis. The parts of the insulation which do no work need not necessarily be compressed very thoroughly or have a support. The toroidal electrode, therefore, when necessary for lightness or for other reasons, can be made of sheet metal and have as its meridian section an opening, as shown in Figs. 3 and 4. In Fig. 3 the opening in the hollow electrode $2^a$ faces outwardly while in Fig. 4 the opening in the hollow electrode $2^b$ faces inwardly.

In a few cases, the electrode may be destined to work floating, that is without applied potential but at a potential automatically determined from the position of the electrode itself in the electric field.

In most cases, however, the electrode will have to be electrically connected to parts of the circuit and will therefore be provided with connecting means, which can be of various types and which in each case will be called a connector. The connector will always be located in a place where the electric stress is weak or nil. In case the electrode is hollow and has an incomplete surface, the connector will preferably be located inside the electrode, as indicated at 8 in Figs. 3 and 4, and a small metallic wire or strand 9 will be connected here and pass through a small hole made in the paper insulation on the side opposite to the second electrode. The hole will, of course, be made in the paper after it has been wound and the wire 9, previously provided inside the electrode, will be made to pass through the hole.

If the electrode is solid, the connector can be conveniently fixed to the electrode itself, on a small flat zone thereof as shown by A—A in Fig. 5, fixing it after the insulation has been applied. In the zone A—A, the insulation will not be as compact as in the rest of the electrode. This fact, which will not have any disadvantageous electrical effect owing to the smallness of the zone, makes it possible to individuate the zone itself so that the insulating covering can be bored at this point and the connector 8a introduced and fixed in a screw hole 10 located in the center of the zone. This operation will be easier if the entrance to the hole 10 is conical.

Electrodes forming the subject matter of the present invention can be employed in numerous cases. Among them may be mentioned, as of particular importance, cable terminals, bushings and cable joints.

Fig. 6 shows schematically a cable terminal where a series of toroidal electrodes 11 covered with insulation is used. They are electrically connected together by connectors 8b and with the lead sheath 12 of the cable and have a gradually increasing diameter and form a kind of funnel-shaped prolongation of the lead sheath. Owing to their high dielectric strength, they offer a considerable resistance to perforation in the region where a high gradient of potential is present.

Fig. 7 shows schematically a bushing. The conductor 13 at the point of passage therethrough besides being covered with insulation 14, is surrounded by two series of toroidal electrodes 11. These have a gradually increasing diameter on both sides of the center and are electrically connected together by wires 8b and to earth by wire 8c.

A particularly important case is that of cable joints for high tensions. As shown in Fig. 8, toroidal electrodes 11 can first of all be used in this case also, as in terminals, to build up a prolongation of the lead sheath with a high dielectric strength. The toroidial electrodes can, however, be used in the joints with still greater advantage to increase the perforation tension between the jointing socket 15 of the conductors 15a of the two cables and the joint casing 16 which is connected at its ends to the lead sheath. It is well known that in many cases said socket has necessarily an irregular surface, for instance as in stop-joints for oil-filled cables, the latter having longitudinal channels 15b filled with oil. It is then advisable to surround the socket with a metallic screen 17 having a smooth external surface and electrically connected to the socket. There is, in fact, a lower gradient of potential on its surface, besides this it is easier to protect the screen than the socket, by means of insulation, from the discharges against the casing 16. This screen also can be built up by an insulated toroidal electrode according to the present invention, as for example, of the form shown in Fig. 4.

Lastly, other or auxiliary toroidal electrodes suitably covered with insulation have been found very useful in joints, placing them near the two ends of the screen as shown in 18 of Fig. 8. These electrodes also are connected to the socket and are therefore put under tension. Their function is to increase the perforation tension in the regions near the two ends of the socket 15, which are particularly subject to discharge.

The insulated electrodes which are the object of the present invention can be used with advantage in other cases also, besides those mentioned above, and it is understood that the constructive forms described herein, of both the electrode and its connector, are only example cases.

What I claim as new and desire to secure by Letters Patent of the United States is:

1. An electrode unit complete in itself for application as such to high tension electrical apparatus comprising a metal toroidal element having a well rounded surface free of projections with a concave portion in the region farthest from the axis thereof, impregnated insulating tape threaded through the center of the element and over the entire rounded surface thereof in layers and forming a complete covering therefor, and a binding band surrounding the element and holding the tape in contact with the surface of said concave portion.

2. In combination, a pair of sheathed high potential conductors arranged end to end, each having a central core, a filling of liquid insulation for the cores, insulation on the conductors which is impregnated by the liquid insulation, a socket electrically uniting said ends, a main hollow toroidal electrode enclosing the socket and extending axially on both sides thereof and in which the socket is centrally located, a pair of auxiliary electrodes of ring form of shorter axial length than the main electrode located one closely adjacent each end thereof where electrical stresses tend to be the greatest, connectors for electrically connecting the main and auxiliary electrodes to the conductors so that they all have the same potential, and insulation applied over the ends of the conductors and also over the main and auxiliary electrodes forming a covering therefor.

3. An electrode unit complete in itself for application as such to high tension electrical apparatus comprising a unitary ring having smooth inner and outer surfaces and well rounded ends and a small flat zone located in a region where the electrical stress is less than the maximum, insulating tape tightly wound in overlapping layers over the surface of the ring to form a complete covering therefor, said tape extending axially over the inner and outer surfaces and over the rounded ends, the covering having a perforation located at said flat zone, and a connector extending through the perforation into the ring for establishing an electrical connection between the ring and a conductor external thereto.

LUIGI EMANUELI.